June 3, 1958     S. STEIN     2,837,619
STRAIN SENSITIVE ELEMENT AND METHOD OF MANUFACTURE
Filed Aug. 30, 1954
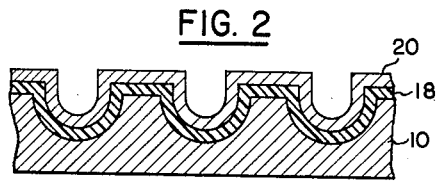
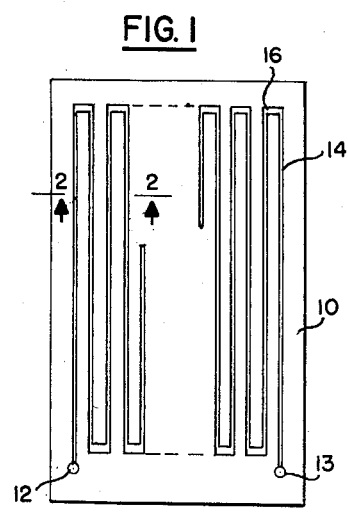
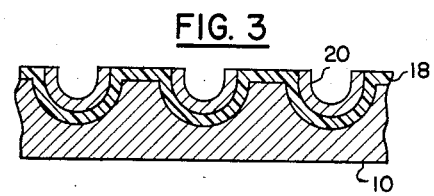
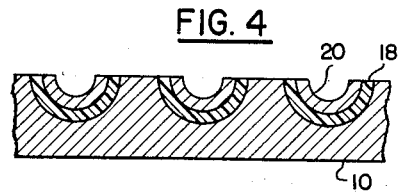
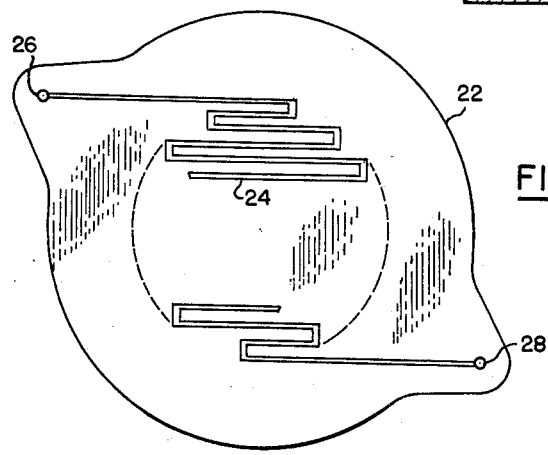
INVENTOR.
SAMUEL STEIN
BY George Sipkin
      H. R. Heintzen
ATTORNEYS 2,837,619

STRAIN SENSITIVE ELEMENT AND METHOD OF MANUFACTURE

Samuel Stein, Shaker Heights, Ohio

Application August 30, 1954, Serial No. 453,165

1 Claim. (Cl. 201—63)

(Granted under Title 35, U. S. Code (1952), sec. 266)

The invention described herein may be manufactured and used by or for the Government of the United States of America for governmental purposes without the payment of any royalties thereon or therefor.

This invention relates to strain sensitive elements and more especially to strain sensitive elements which change their electrical resistance in response to strains.

The presently known strain sensitive elements comprise a fine wire convoluted and cemented to a felt base which in turn may be cemented to a machine element to determine the degree of strain thereof. The felt base is so secured to the machine element that the strain stretches the wire, thereby reducing its diameter and increasing its electrical resistance. The electrical resistance of the wire indicates the strain in the machine element.

It is an object of the invention to provide a strain sensitive element of the type described in which the length of the electrical conductor is very large with respect to its cross sectional area.

It is another object of the invention to provide an element of the type described in which the length of the electrical conductor is very large with respect to the size of the element.

It is a further object of the invention to provide an element of the type described which is of high sensitivity and is adapted for operation at high temperatures.

It is a still further object of the invention to provide a method of manufacturing a strain sensitive element having the above characteristics.

Other objects and advantages of the invention will hereinafter become more fully apparent from the following description of the annexed drawings, which illustrate a preferred embodiment, and wherein:

Fig. 1 is a view in elevation of the strain sensitive element of this invention;

Fig. 2 is an enlarged sectional view on the line 2—2 of Fig. 1 showing a step in the process of manufacturing the element;

Fig. 3 is a view similar to Fig. 2 showing another step in the process of manufacturing the element;

Fig. 4 is a view similar to Fig. 2, but showing a further step in the process of manufacturing the element; and Fig. 5 is a view in elevation of a machine element on which the strain sensitive element of this invention has been formed.

In the drawings, the reference numeral 10 designates a flat sheet of metal to which two electrical terminals 12 and 13 have been secured. The terminals 12 and 13 are electrically insulated from the sheet 10 and from each other. A groove 14 is formed on the flat surface of the sheet 10, the groove 14 extending from the terminal 12 to the terminal 13. The groove 14 passes back and forth across the surface of the sheet 10 in parallel passes which may be placed so closely together that there are at least 150 passes per inch. These passes may be embossed on the sheet or may be inscribed on it with the end portions 16 of the two adjacent passes connected together to form a continuous passage.

A thin layer of electrical insulating material 18 is now formed on the flat surface of the sheet 10 including the surfaces of the groove 14. Thereafter a layer of electrical conducting material 20 such as metal is formed over the electrical insulating material 18 which electrical conducting material 20 also connects with the electrical terminals 12 and 13. The various layers on the sheet 10 now appear as shown in Fig. 2.

The flat surface of the sheet 10 is then abraded to remove the layer of electrical conducting material 20 from the flat surface, the resulting sheet appearing as shown in Fig. 3. If desired, the flat surface may be further abraded to remove also the non-conducting material 18 on the flat surface of the sheet 10 as shown in Fig. 4. Either method of construction leaves a layer of electrical conducting material 20 in the grooves 14 which material forms a long narrow electrical conductor connecting the terminals 12 and 13.

The strain sensitive element may be secured to the object to be stressed so that the electrically conducting metal 20 in the parallel passes of the groove 14 is either stretched or compressed depending on the direction of the strain. The sheet 10 is preferably very thin and of such elasticity that it does not unduly resist the strain and returns to its original position after the stress is removed.

The strain sensitive element of this invention may also be formed directly on the machine to be tested. It may be formed, for example, on a metal diaphragm 22 such as shown in Fig. 5 in which the groove 24 and the terminals 26 and 28 are similar to the groove 14 and the terminals 12 and 13, respectively, of Fig. 1. When in use, the diaphragm 22 is secured at its edges to a rigid housing and the central portion of the diaphragm 22 may be subjected to fluid pressure. The central portion of the diaphragm 22 will be dished outwardly by the fluid pressure which dishing stretches the conductive metal in the groove 24 and increases the electrical resistance of the metal thus giving an indication of the intensity of the fluid pressure.

There are various processes for forming the layer of electrical insulating material 18 on the metal sheet 10. If the metal of the sheet 10 is aluminium, the layer may be formed by making the aluminium the anode in an electrolytic bath of dilute sulfuric acid. This process is known to those skilled in the art as "anodizing" the metal. The insulating layer 18 may also be formed by immersing the aluminium in a hot solution of sodium carbonate, sodium dichromate, and sodium aluminate. If the metal of the sheet 10 is steel, a process known by the trade name "Parkerizing" may be employed which process produces a coating consisting chiefly of iron and manganese phosphates on the sheet 10. A layer of enamel varnish may also be applied to the sheet 10 and forms a suitable insulating layer if high temperatures are not encountered. If the sheet 10 is formed of an electrical non-conductor no additional layer of electrical insulating material is needed.

The electrical conducting layer 20 is preferably platinum and may be deposited by a vacuum electroplating process.

The end portions 16 of the groove 14 are preferably of greater cross sectional area than the parallel portions of the groove 14 because as the strain sensitive element of this invention is stressed to elongate the metal in the parallel portions of the groove 14, the metal in the end portions 16 of the groove 14 is stretched broadwise. Under these conditions, the electrical resistance of the metal 20 in the parallel portions of the groove 14 is increased whereas the electrical resistance of the metal 20 in the end portions 16 of the groove 14 is decreased. The greater cross sectional area of the metal 20 in the end portions 16 of the groove 14 as compared to the cross sectional area of the electrical conductor 20 in the parallel portions of the groove 14 minimizes the adverse effect of the metal in the end portion 16.

It will be apparent from the above that this invention provides a strain sensitive electrical resistance element in which the electrical conducting element may be made very long with respect to its cross sectional area and also very long per unit of area of the element. The invention further provides a novel process of fabricating the element.

Obviously many modifications and variations of the present invention are possible in the light of the above teachings. It is therefore to be understood that within the scope of the appended claims the invention may be practiced otherwise than as specifically described.

What is claimed is:

A strain sensitive element comprising a base formed of resilient sheet metal, a group of closely spaced and substantially parallel grooves formed in one face of said base, a plurality of end grooves of greater cross-section than the parallel grooves and interconnecting alternate adjacent ends of the parallel grooves to place the parallel grooves in series, said group numbering at least 150 grooves per inch transversely of said base to provide a single continuous and extended groovular path, an insulated terminal post at each end of the groovular path for connection to a resistance measuring instrument, a first thin continuous layer of insulating material within said groovular path between said terminal posts, a second thin continuous layer of conductive material disposed within said groovular path and superposed on the insulating material to provide a continuous electrical conductive path between said terminal posts whereby as strain is applied thereto the conductive path will become deformed with a resultant variation in the resistance of the electrical path as a measure of the applied strain.

References Cited in the file of this patent

UNITED STATES PATENTS

| | | |
|---|---|---|
| 851,440 | Rivers | Apr. 23, 1907 |
| 1,767,715 | Stoekle | June 24, 1930 |
| 2,252,464 | Kearns et al. | Aug. 12, 1941 |
| 2,316,203 | Simmons | Apr. 13, 1943 |
| 2,415,082 | Burr | Feb. 4, 1947 |
| 2,467,752 | Howe | Apr. 19, 1949 |
| 2,508,456 | Gustafsson | May 23, 1950 |
| 2,629,166 | Marsten et al. | Feb. 24, 1953 |
| 2,647,976 | Kasten et al. | Aug. 4, 1953 |
| 2,693,023 | Kerridge et al. | Nov. 2, 1954 |